United States Patent
Kelkar et al.

(10) Patent No.: US 10,725,664 B2
(45) Date of Patent: *Jul. 28, 2020

(54) DETERMINING WEIGHT VALUES FOR STORAGE DEVICES IN A STORAGE TIER TO USE TO SELECT ONE OF THE STORAGE DEVICES TO USE AS A TARGET STORAGE TO WHICH DATA FROM A SOURCE STORAGE IS MIGRATED

(71) Applicant: International Business Machines Corporation, Armonk, NY (US)

(72) Inventors: Bhooshan P. Kelkar, Bangalore (IN); Sandeep R. Patil, Pune (IN); Riyazahamad M. Shiraguppi, Pune (IN); Prashant Sodhiya, Pune (IN)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/125,655

(22) Filed: Sep. 7, 2018

(65) Prior Publication Data

US 2019/0004712 A1     Jan. 3, 2019

Related U.S. Application Data

(63) Continuation of application No. 15/176,126, filed on Jun. 7, 2016, now Pat. No. 10,101,921, which is a
(Continued)

(51) Int. Cl.
*G06F 12/00*     (2006.01)
*G06F 3/06*     (2006.01)
(Continued)

(52) U.S. Cl.
CPC .......... *G06F 3/0613* (2013.01); *G06F 3/0611* (2013.01); *G06F 3/0616* (2013.01);
(Continued)

(58) Field of Classification Search
CPC .... G06F 3/0611; G06F 3/0685; G06F 3/0647; G06F 2003/0692
See application file for complete search history.

(56) References Cited

U.S. PATENT DOCUMENTS 6,948,102 B2 *   9/2005   Smith ................... G06F 11/004
                                                                                            706/15
7,114,013 B2     9/2006   Bakke et al.
(Continued)

OTHER PUBLICATIONS

"Storage Tiering for DB2 for Linux, Unix, and Windows (LUW) with EMC Symmetrix VMAX and Enginuity 5875", EMC Corporation, dated Jan. 2011, pp. 1-47.
(Continued)

*Primary Examiner* — Mark A Giardino, Jr.
(74) *Attorney, Agent, or Firm* — David W. Victor; Konrad, Raynes, Davda and Victor LLP

(57) ABSTRACT

The present invention relates to a method, system, and computer program product for determining storage device weight values to use to select one of the storage devices to use as a target storage to which data from a source storage is migrated. A determination is made, for each of the storage devices, of static parameter values for static parameters comprising attributes of the storage device and dynamic parameter values for dynamic parameters providing device health information determined by accessing the storage device to determine operational conditions at the storage device. Storage device weight values are determined as a function of the static parameter values and the dynamic parameter values of the device. The determined storage device weight values are used to select one of the storage devices as the target storage to which data from the source storage is migrated.

21 Claims, 5 Drawing Sheets

Related U.S. Application Data continuation of application No. 14/676,726, filed on Apr. 1, 2015, now Pat. No. 9,367,249, and a continuation of application No. 13/733,112, filed on Jan. 2, 2013, now Pat. No. 9,047,239.

(51) Int. Cl.
    *G06F 12/16* (2006.01)
    *G06F 13/00* (2006.01)
    *G06F 13/28* (2006.01)

(52) U.S. Cl.
    CPC .......... *G06F 3/0647* (2013.01); *G06F 3/0659* (2013.01); *G06F 3/0685* (2013.01); *G06F 3/0688* (2013.01); *G06F 12/16* (2013.01); *G06F 3/0634* (2013.01); *G06F 2003/0692* (2013.01)

(56) References Cited

U.S. PATENT DOCUMENTS

| | | | |
|---|---|---|---|
| 7,167,965 | B2 | 1/2007 | Alvarez et al. |
| 7,509,409 | B2 | 3/2009 | Penny et al. |
| 7,539,709 | B1 | 5/2009 | Vengerov et al. |
| 7,606,934 | B1 | 10/2009 | Vengerov et al. |
| 7,730,042 | B2 | 6/2010 | Devarakonda et al. |
| 8,099,569 | B2 | 1/2012 | Sugiura |
| 8,166,257 | B1 | 4/2012 | Holl, II et al. |
| 8,370,597 | B1 | 2/2013 | Chatterjee et al. |
| 8,375,190 | B2 | 2/2013 | Hamilton et al. |
| 9,047,239 | B2 | 6/2015 | Kelkar et al. |
| 9,367,249 | B2 | 6/2016 | Kelkar et al. |
| 9,798,564 | B2 * | 10/2017 | Ponsford ............ G06F 9/45533 |
| 2006/0041719 | A1 | 2/2006 | Chui et al. |
| 2006/0069886 | A1 * | 3/2006 | Tulyani ................ G06F 3/0605 711/161 |
| 2006/0112247 | A1 | 5/2006 | Ramany et al. |
| 2006/0288048 | A1 * | 12/2006 | Kamohara ............ G06F 16/119 |
| 2008/0172539 | A1 | 7/2008 | Boss et al. |
| 2009/0327602 | A1 * | 12/2009 | Moore ................. G06F 3/0616 711/114 |
| 2010/0174677 | A1 | 7/2010 | Zahavi et al. |
| 2011/0167217 | A1 | 7/2011 | Montgomery |
| 2011/0197027 | A1 | 8/2011 | Balasubramanian et al. |
| 2012/0066439 | A1 | 3/2012 | Fillingim |
| 2012/0102350 | A1 | 4/2012 | Belluomini et al. |
| 2014/0189196 | A1 | 7/2014 | Kelkar et al. |
| 2016/0291886 | A1 | 10/2016 | Kelkar et al. |

OTHER PUBLICATIONS

"SSD Life Control Your SSD Lifetime", (online) retrieved from the Internet at URL>http://ssd-life.com/eng/how.html, retrieved on Dec. 1, 2012, pp. 1-3.

"Protect Yourself from Hard Drive Failure", HDDlife, (online) retrieved from the internet at URL>http://hdlife.com/index.html, retrieved on Dec. 1, 2012, pp. 1-4.

"HDDlife Features", HDDlife, (online) retrieved from the internet at URL>http://hdlife.com/eng/features/.html, on Dec. 1, 2012, pp. 1-4.

Wikipedia, "S.M.A.R.T." (online), retrieved from the internet at URL>http:en.wikipedia.org/w/index.php?title=S.M.A.R.T.&printable=yes, retrieved on Dec. 1, 2012, pp. 1-14.

Notice of Allowance, dated Jan. 30, 2015, for U.S. Appl. No. 13/733,112 (37.294), filed Jan. 2, 2013, invented by Bhooshan P. Kelkar et al., Total 14 pages.

"TapeAlert.org", (online), retrievd from the internet at URL>http://www.tapealert.org, retrieved from the internet on Dec. 1, 2012, dated Jan. 15, 2009, pp. 1-2.

Wikipedia, "Flash Memory" (online), retrieved from the internet at URL>http://en.wikipedia.org/w/index.php?title=Flash_memory&printable=yes, retrieved on Jan. 2, 2013, pp. 1-16.

US Patent Application, dated Jan. 2, 2013, for U.S. Appl. No. 13/733,112 (37.294), filed Jan. 2, 2013, invented by Bhooshan P. Kelkar et al., Total 30 pages.

Office Action, dated Aug. 27, 2014, for U.S. Appl. No. 13/733,112 (37.294), filed Jan. 2, 2013, invented by Bhooshan P. Kelkar et al., Total 22 pages.

Response to Office Action, dated Dec. 28, 2014, for U.S. Appl. No. 13/733,112 (37.294), filed Jan. 2, 2013, invented by Bhooshan P. Kelkar et al., Total 17 pages.

US Patent Application, dated Apr. 1, 2015, for U.S. Appl. No. 14/676,726 (37.294C1), filed Apr. 1, 2015, invented by Bhooshan P. Kelkar et al., Total 30 pages.

Preliminary Amendment, dated Apr. 1, 2015, for U.S. Appl. No. 14/676,726 (37.294C1), filed Apr. 1, 2015, invented by Bhooshan P. Kelkar et al., Total 11 pages.

Office Action, dated Nov. 3, 2015, for U.S. Appl. No. 14/676,726 (37.294C1), filed Apr. 1, 2015, invented by Bhooshan P. Kelkar et al., Total 23 pages.

Response to Office Action, dated Feb. 3, 2016, for U.S. Appl. No. 14/676,726 (37.294C1), filed Apr. 1, 2015, invented by Bhooshan P. Kelkar et al., Total 13 pages.

Notice of Allowance, dated Mar. 14, 2016, for U.S. Appl. No. 14/676,726 (37.294C1), filed Apr. 1, 2015, invented by Bhooshan P. Kelkar et al., Total 10 pages.

US Patent Application, dated Jun. 7, 2016, for U.S. Appl. No. 15/176,126 (37.294C2) invented by Bhooshan P. Kelkar et al., Total 30 pages.

Office Action, dated May 5, 2017, for U.S. Appl. No. 15/176,126 (37.294C2) invented by Bhooshan P. Kelkar et al., Total 28 pages.

Response to Office Action, dated Jul. 7, 2017, for U.S. Appl. No. 15/176,126 (37.294C2) invented by Bhooshan P. Kelkar et al., Total 13 pages.

Final Office Action, dated Feb. 22, 2018, for U.S. Appl. No. 15/176,126 (37.294C2) invented by Bhooshan P. Kelkar et al., Total 22 pages.

Response to Final Office Action, dated Apr. 23, 2018, for U.S. Appl. No. 15/176,126 (37.294C2) invented by Bhooshan P. Kelkar et al., Total 14 pages.

Response to Final Office Action, dated May 27, 2018, for U.S. Appl. No. 15/176,126 (37.294C2) invented by Bhooshan P. Kelkar et al., Total 9 pages.

Notice of Allowance, dated Jun. 11, 2018, for U.S. Appl. No. 15/176,126 (37.294C2) invented by Bhooshan P. Kelkar et al., Total 6 pages.

Preliminary Amendment, dated Jun. 7, 2016, for U.S. Appl. No. 15/176,126 (37.294C2) invented by Bhooshan P. Kelkar et al., Total 9 pages.

List of Patents or Patent Applications Treated As Related, dated Sep. 7, 2018, pp. 2.

* cited by examiner

FIG. 2 Static Parameters

Storage Device Type (Tier) [52] | Static Parameter₁ [54₁] | Static Parameter Weight₁ [56₁] | Static Parameter₂ [54₂] | Static Parameter Weight₂ [56₂] | ... | Static Parameterₙ [54ₙ] | Static Parameter Weightₙ [56ₙ] | Static Weight [58] | Vendor Weight [60]  — [50]

FIG. 3 Dynamic Parameters

Storage Device Type (Tier) [72] | Dynamic Parameter₁ [74₁] | Dynamic Parameter Weight₁ [76₁] | Dynamic Parameter₂ [74₂] | Dynamic Parameter Weight₂ [76₂] | ... | Dynamic Parameterₘ [74ₙ] | Dynamic Parameter Weightₘ [76ₙ] | Dynamic Weight [78] — [70]

FIG. 4 Vendor Value

Storage Device Vendor [82] | Vendor Value [84] — [80]

Static Parameter Values

Dynamic Parameter Values

Storage Device Specific Information

DETERMINING WEIGHT VALUES FOR STORAGE DEVICES IN A STORAGE TIER TO USE TO SELECT ONE OF THE STORAGE DEVICES TO USE AS A TARGET STORAGE TO WHICH DATA FROM A SOURCE STORAGE IS MIGRATED

BACKGROUND OF THE INVENTION

1. Field of the Invention

The present invention relates to a method, system, and computer program product for determining weight values for storage devices in a storage tier to use to select one of the storage devices to use as a target storage to which data from a source storage is migrated.

2. Description of the Related Art

A Multi-tiered Storage System is a strategic networked storage method where data is stored on various types of storage devices primarily based on criteria of the access, frequency of use, security and data recovery requirements. For space and performance optimization, the data is transferred between high-cost and low-cost storage media. Such systems exist because high-speed storage devices, such as Solid State devices (SSD), Hard Disk Drive Arrays, etc., are more expensive (per byte stored) than the slower storage devices, such as optical discs and magnetic tape drives. While it would be ideal to have all data available on high-speed devices all the time, this is prohibitively expensive for many organizations. Instead, tiered systems store the bulk of the enterprise's data on slower devices, and then migrate more frequently accessed data to faster media when needed. The advantage is that the total amount of stored data can be much larger than the capacity of the active storage media available. In effect, tiered systems turn the fast storage devices into caches for the slower mass storage devices.

In an Enterprise Data Center with four tiers of storage devices, each tier comprises heterogeneous devices of similar storage class, such as devices from different vendors, devices with different quality of service (QoS) parameters such as—durability, Mean Time between Failure etc. Typically the Tier-1 devices are costlier then Tier-2 devices, and Tier-2 devices are costlier then Tier-3 devices and reverse is the order of data performance in these tiers. In one example, Tier 0 comprises volatile memory (e.g. RAM), Tier 1 comprises fastest access storage devices, such as solid state storage devices (SSDs), Tier 2 comprises a capacity tier with cost-optimized storage systems, such as a Serial AT Attachment (SATA) Redundant Array of Independent Disks (RAID), which is used to store less active data migrated from Tier 1, and Tier 3 which comprises an archive tier that provides a storage layer for long term archiving. Tier 3 is used for data migrated from Tier 2 that is not required in near future.

In a typical multi-tiered system, data files which are frequently used/accessed are stored on faster devices, but are eventually migrated (based on policies) to slower devices if they are not used for a certain period of time. In this way, data may be migrated from Tier-1 to Tier-2, and from Tier-2 to Tier-3 devices. When a file is migrated, a reference to the file, called a stub, is left on the device from which the data is migrated to make the file appear immediately available for use when in fact the data represented by the stub may be on a lower tier device. When a stub file is accessed by the application, device driver software intercepts the access, retrieves the data from its actual location and writes the data file back to the higher tier with the stub reference to allow the user to proceed. This process is transparent to the user who may be unaware that the file data was being stored on a different storage device. However, the user may experience a slight delay resulting from having to migrate back the data to the location of the stub file.

SUMMARY

The present invention relates to a method, system, and computer program product for determining weight values for storage devices in a storage tier to use to select one of the storage devices to use as a target storage to which data from a source storage is migrated. A determination is made, for each of the storage devices, of static parameter values for static parameters comprising attributes of the storage device and dynamic parameter values for dynamic parameters providing device health information determined by accessing the storage device to determine operational conditions at the storage device. A determination is made, for each of the storage devices, of a storage device weight value as a function of the static parameter values and the dynamic parameter values of the storage device. The determined storage device weight values of the storage devices are used to select one of the storage devices as the target storage to which data from the source storage is migrated.

BRIEF DESCRIPTION OF THE DRAWINGS

FIG. 2 illustrates an embodiment of static parameters.

FIG. 3 illustrates an embodiment of dynamic parameters.

FIG. 4 illustrates an embodiment of a vendor value.

DETAILED DESCRIPTION

In multi-tiered storage systems using data migration from one tier to another, a problem may occur if a storage device selected in a lower tier to which data is migrated has a health profile that indicates the selected device may not be able to store the data for the expected duration for the tier. This problem occurs because the migration did not consider the health factor in the target tier and migrated the data to a disk having an unexpected short life span even though other storage devices in the same tier have a longer life span. If this occurs, data migrated to the lower tier may experience an untimely loss when the storage device having the migrated data experiences an untimely failure before expected.

Described embodiments provide techniques to determine a storage device weight value for storage devices in different tiers based on static parameter values of the device and dynamic parameter values comprising operational states of the storage devices indicating a health of the storage device. The storage device weight may further take into account a vendor preference. This calculated storage device weight values may then be used to select a storage device in a tier as the target for migration that has the highest weight value, indicating the highest health and capabilities in that tier.

Figure 1:
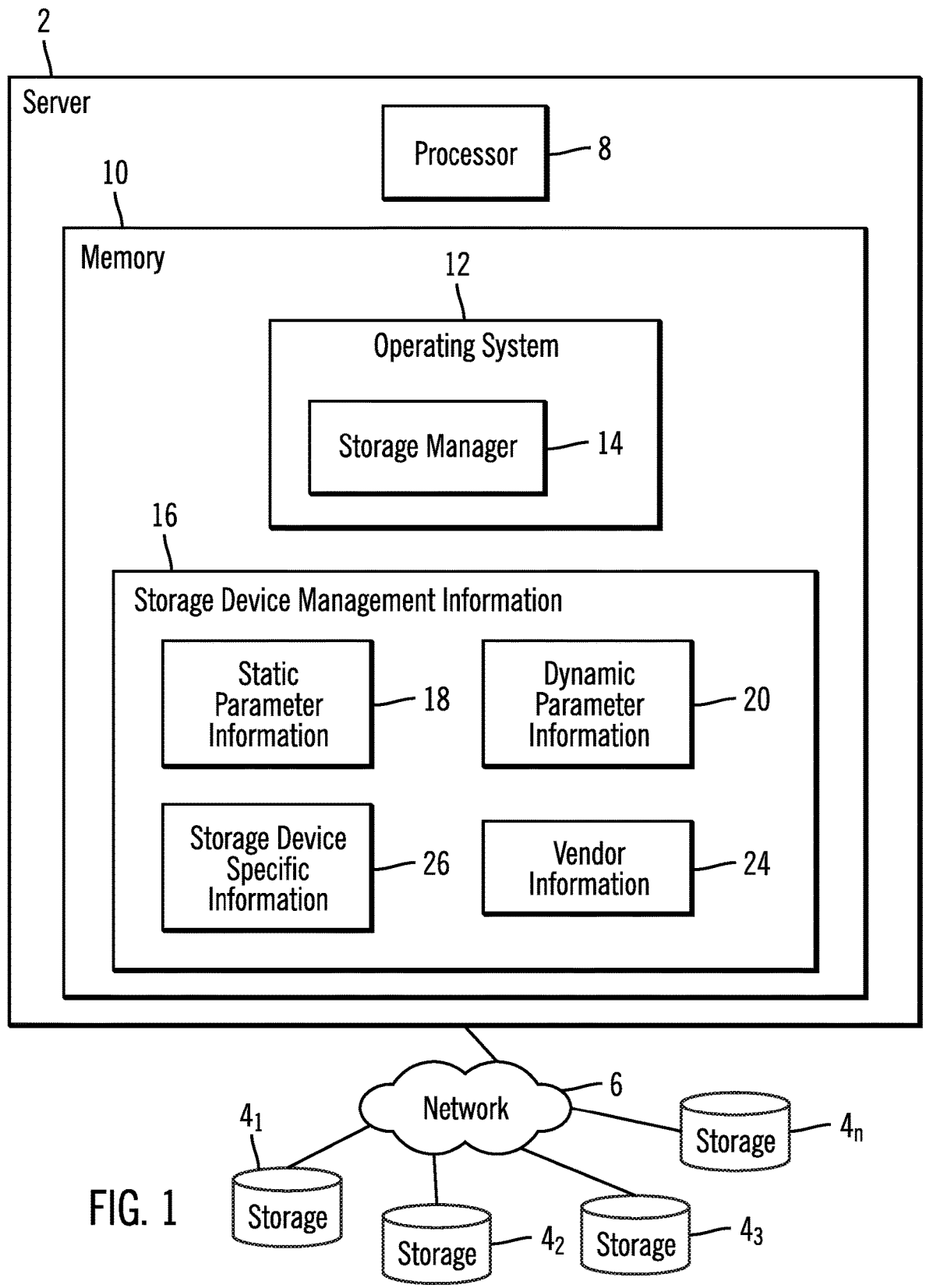
FIG. 1 illustrates an embodiment of a storage environment.

FIG. 1 illustrates a network storage environment having a server 2 managing the storage of data on multiple storage devices $4_1, 4_2, 4_3 \ldots 4n$ over a network 6. The server 2 includes a processor 8 comprising one or more processor devices and a memory 10 in which an operating system 12 is loaded to be executed by the processor 8. The operating system 12 includes a storage manager 14 to manage the storage of data in storage devices $4_1, 4_2, 4_3 \ldots 4n$ and migrate data between storage devices $4_1, 4_2, 4_3 \ldots 4n$ based on data management criteria, such as used in a multi-tiered storage system or hierarchical storage management system (HSM). The storage devices $4_1, 4_2, 4_3 \ldots 4n$ may be grouped in multiple tiers based on their performance with respect to data access, where each tier has a class of slower access devices than a previous tier in the hierarchy of tiers. The storage tiers may be based on characteristics such as speed of their Input/Output (I/O) access profile, redundancy, etc. In one embodiment, the first tier may comprise memory, second tier solid state storage devices (SSD), third tier hard disk drive (HDDs), and fourth tier an archival storage medium, such as tape, optical disk or slower access hard disk drives. The storage manager 14 may manage the transfer of data and objects between tiers based upon characteristics of the data changing, such as frequency of access, size, etc.

To select devices for migration, the storage manager 14 maintains storage device management information 16, including static parameter information 18 providing information on static parameters used for different types of storage devices and the static parameter values for different storage device types (tiers); dynamic parameter information 20 related to queried operational states of the storage devices $4_1, 4_2, 4_3 \ldots 4n$; vendor information 24 comprising weights assigned to different vendors to indicate that certain vendors have selection priority over others; and storage device specific information 26 having the measured dynamic parameter values from the storage devices $4_1, 4_2, 4_3 \ldots 4n$ and calculated weight values for the storage devices $4_1, 4_2, 4_3 \ldots 4n$.

The server 2 may communicate with the storage devices $4_1, 4_2, 4_3 \ldots 4n$ over a network 6 such as a Storage Area Network (SAN), Wide Area Network (WAN), Local Area Network (LAN), the Internet, and Intranet, a wireless network, wired network, etc.

The storage devices $4_1, 4_2, 4_3 \ldots 4n$ may comprise different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices $4_1, 4_2, 4_3 \ldots 4n$ may further be configured into an array of devices, such as Just a Bunch of Disks (JBOD), Direct Access Storage Device (DASD), Redundant Array of Independent Disks (RAID) array, virtualization device, etc. Further, the storage devices $4_1, 4_2, 4_3 \ldots 4n$ may comprise heterogeneous storage devices from different vendors.

The memory 10 may comprise one or more volatile or non-volatile memory devices. The storage manager 14 may be implemented as a program that is part of the operating system 12. Alternatively, the storage manager 14 may be implemented as application code external to the operating system 12 or may be implemented with hardware logic, such as a n Application Specific Integrated Circuit (ASIC), or as a programmable processor executing code in a computer readable storage medium.

The operating system 12 may call the storage manager 14 to migrate data that is not frequently accessed and/or having lower priority from a higher priority tier, e.g., SSDs, to a lower priority tier, e.g., having HDDs employing hierarchical management storage techniques known in the art. Data characteristics other than or in addition to the frequency of data access and priority of the data may be used to determine whether to migrate data between higher and lower tier storage devices in the storage hierarchy.

FIG. 2 illustrates an embodiment of an instance of static parameters 50 in the static parameter information 18 for a storage device type or tier. A static parameter instance 50 specifies a storage device type 52, e.g., a tier, and one or more static parameters $54_1, 54_2 \ldots 54_n$ whose values the storage manager 14 considers when selecting a storage device $4_1, 4_2, 4_3 \ldots 4n$ of the specified type (tier) 52 to use as the target for migrating data. For each static parameter $54_1, 54_2 \ldots 54_n$, a static parameter weight $56_1, 56_2 \ldots 56_n$ may be provided that weights the static parameter value with respect to other values in the calculation. A static parameter weight may comprise a value between zero or one or one if the value is not to be weighted or some other value. A static weight 58 indicates a weight applied to an aggregate of the weighted values for the static parameters $54_1, 54_2 \ldots 54_n$, to weight the static value with respect to others in the calculation. The vendor weight 60 indicates a weight used to weight a vendor value 84 for the storage device type 52. The static parameters $54_1, 54_2 \ldots 54_n$ may comprise parameters gathered from vendor supplied information on the characteristics of the manufactured storage devices $4_1, 4_2, 4_3 \ldots 4n$, such as the mean time between failure, read/write performance, availability, durability, etc.

FIG. 3 illustrates an embodiment of an instance of dynamic parameters 70 in the dynamic parameter information 20 for a storage device type or tier. A dynamic parameter instance 70 specifies a storage device type 72, e.g., a tier, and one or more dynamic parameters $54_k, 54_2 \ldots 54_n$ whose values the storage manager 14 considers when selecting a storage device $4_1, 4_2, 4_3 \ldots 4n$ of the specified type (tier) 72 to use as the target for migrating data. For each dynamic parameter $74_1, 74_2 \ldots 74_n$, a dynamic parameter weight $76_1, 76_2 \ldots 76_n$ may be provided that weights the dynamic parameter value with respect to other values. A dynamic parameter weight may comprise a value between zero or one or one if the value is not to be weighted. A dynamic weight 78 indicates a weight applied to an aggregate of the weighted values for the dynamic parameters $74_1, 74_2 \ldots 74_n$. The dynamic parameters $74_1, 74_2 \ldots 74_n$ may comprise operational states obtained from the storage devices $4_1, 4_2, 4_3 \ldots 4n$ indicating a health of the device that are determined by querying the storage devices.

For instance, for a hard disk drive (HDD) type, the dynamic parameters considered may comprise the head flying height comprising a downward trend in flying height will often presage a head crash; a number of remapped sectors, where a HDD may remap many sectors due to internally-detected errors, which indicates the drive is deteriorating; error correction codes (ECC) and error counts indicating a number of errors encountered by the drive, even if corrected internally; a spin-up time, such that changes in spin-up time can reflect problems with the spindle motor; temperature, such that increases in drive temperature often signal spindle motor problems; data throughput, such that reductions in the transfer rate of the drive can presage various internal problems. An SSD and tape drive may consider other factors. For instance, an SSD drive may consider the number of writes, total data written, etc. which can be used to indicate its remaining life, temperature, etc. For a tape drive, the dynamic parameters considered may comprise the condition of tape heads, condition of media, power, temperature, humidity, number of times written, etc. Other types of devices considered for the tiers may provide other types of static parameters to consider.

FIG. 4 illustrates an embodiment of an instance of a vendor value 80 provided with the vendor information 24 indicating for a storage device vendor 82 a vendor value 84. In this way, an administrator may configure a preference for a particular storage device vendor, such as International Business Machines Corporation, Seagate Technology, Hewlett Packard Company, etc. As mentioned, vendor weight may be provided for a particular storage device type to weight the vendor value 84 when calculating a storage device weight value to use to select a target storage device for migration.

Figure 5:
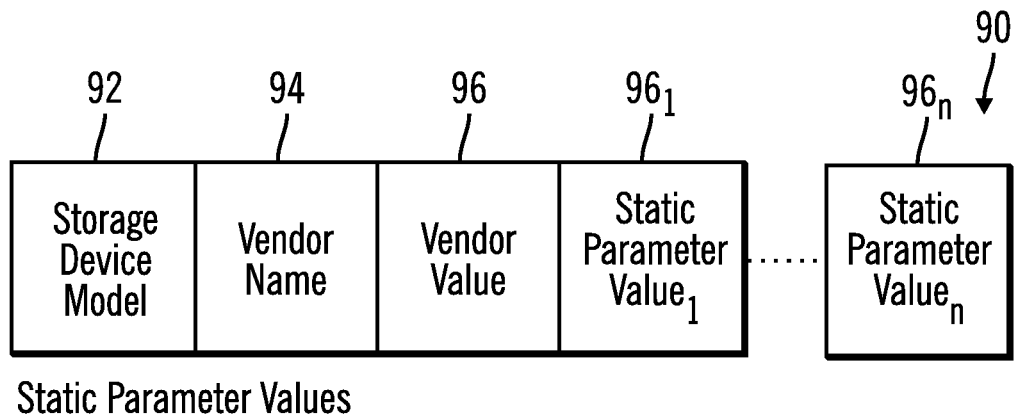
FIG. 5 illustrates an embodiment of static parameter values.

FIG. 5 illustrates an instance of static parameter values 90 for a storage device model maintained in the static parameter information 18 for one model of storage device maintained in the storage environment. The static parameter values 90 indicate a storage device model 92; a vendor name 94 of the model 92, a vendor value 96, which may comprise the vendor value 84; and the one or more static parameter values $96_1 \ldots 96_n$ for the storage device model 92, usually provided by the vendor. The values $96_1 \ldots 96_n$ may correspond to the static parameters $56_1 \ldots 56_n$.

Figure 6:
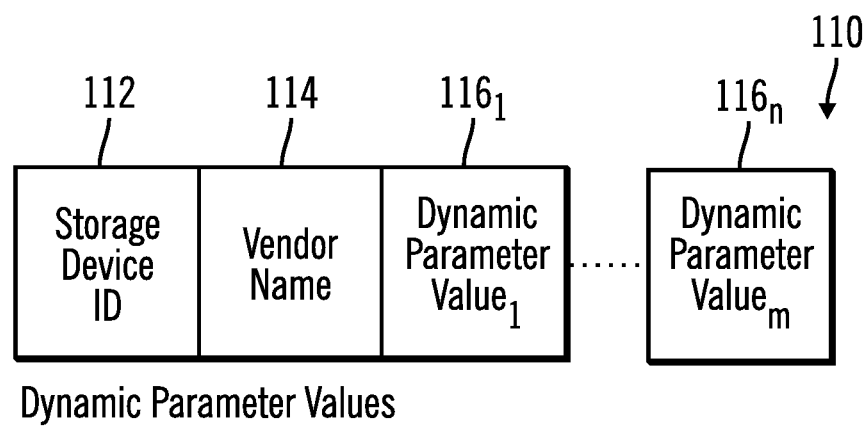
FIG. 6 illustrates an embodiment of dynamic parameter values.

FIG. 6 illustrates an embodiment of an instance of dynamic parameter values 110 for a particular storage device $4_1, 4_2, 4_3 \ldots 4n$ in the storage device specific information 26, including a storage device identifier 112 identifying the device from which the dynamic values were determined; a vendor name 114; and one or more dynamic parameter values $116_1 \ldots 116_m$ determined from the storage device 112. The values $116_1 \ldots 116_m$ may correspond to the dynamic parameters $76_1 \ldots 76_m$.

Figure 7:
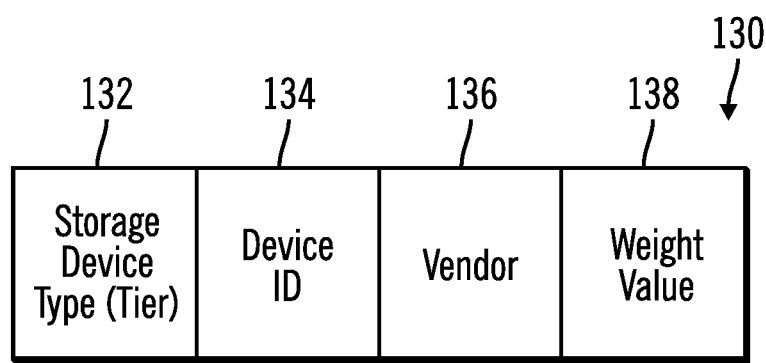
FIG. 7 illustrates an embodiment of storage device information.

FIG. 7 illustrates an embodiment of an instance of storage device specific information 130 of the storage device specific information 26 maintained for a particular storage device $4_1, 4_2, 4_3 \ldots 4n$, including a storage device type 132, such as the storage tier; a storage device ID 134 uniquely identifying the storage device; a vendor 136; and a storage device weight value 138 calculated from the relevant static parameter values $96_1 \ldots 96_n$ and static parameter weights $56_1 \ldots 56_n$ dynamic parameter values $116_1 \ldots 116_m$ and dynamic parameter weights $76_1 \ldots 76_m$, vendor value 84 and vendor weight 60.

In the described embodiments, the use of a reference character such as i, j, k, m, n is used to denote a variable integer number of instances of an element, and may take the same or different integer value when used with different instances of a same element or with different elements.

Figure 8:
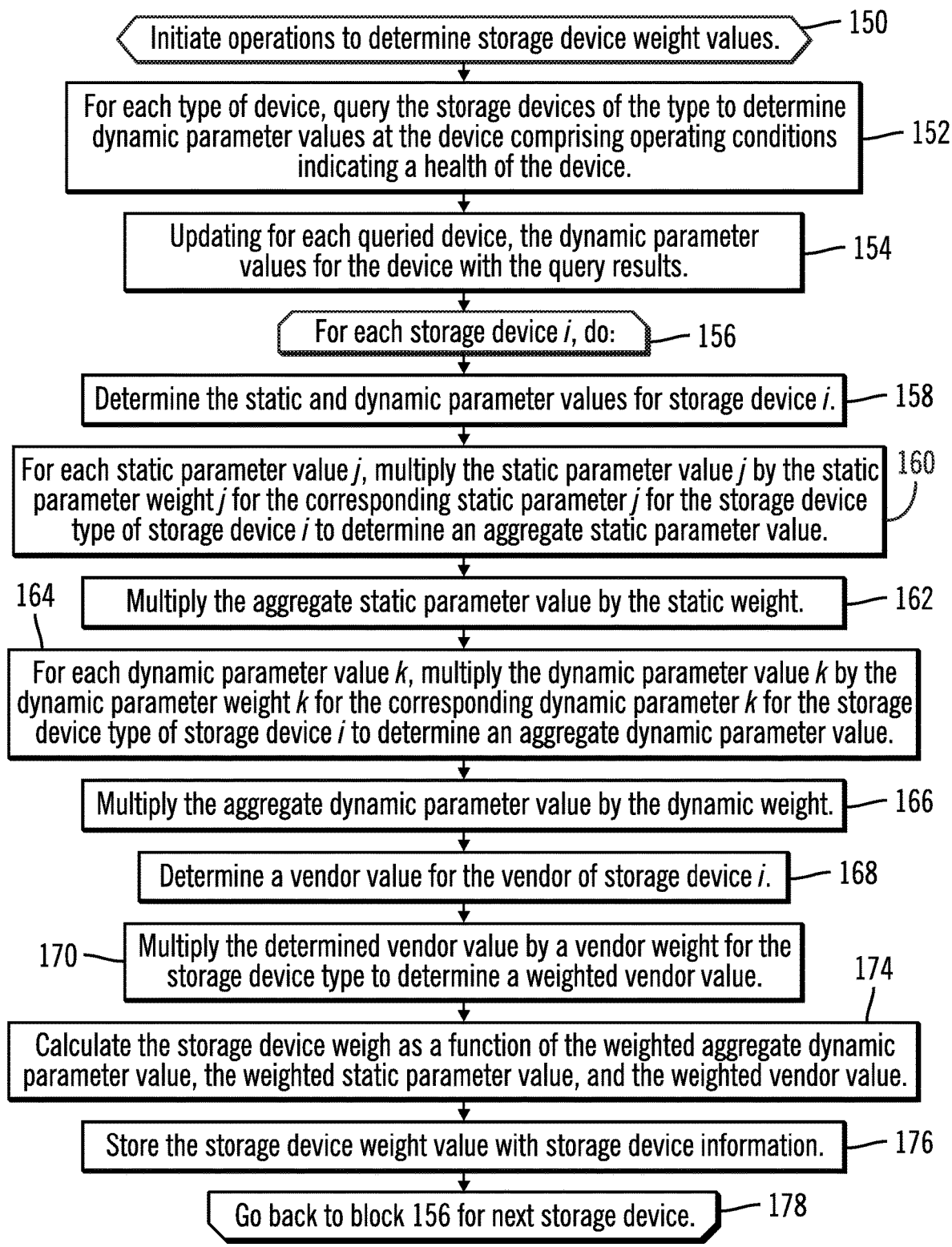
FIG. 8 illustrates an embodiment of operations to determine storage weight values.

FIG. 8 illustrates an embodiment of operations performed by the storage manager 14 to determine storage device weight values that are used to select a target storage device $4_1, 4_2, 4_3 \ldots 4_n$ for data migration. Upon initiating the operations to determine storage device weigh values, for each device type (tier), the storage manager 14 queries the storage devices $4_1, 4_2, 4_3 \ldots 4_n$ of the type (tier) to determine dynamic parameter values $116_1 \ldots 116_n$ at the device comprising operating conditions indicating a health of the device. The storage manager 14 updates the dynamic parameter values 110 for each queried device $4_1, 4_2, 4_3 \ldots 4_n$ with the results of the device query.

For each storage device i of the storage devices $4_1, 4_2, 4_3 \ldots 4_n$, the storage manager 14 performs al loop of operations 156 through 174. At block 158, the storage manager 14 determines the static 90 and dynamic 110 parameter values for storage device i. For each static parameter value $96_j$, the static parameter value $96_j$ is multiplied by the static parameter weight $56_j$ for the corresponding static parameter $54_j$ for the storage device type 52 of storage device i to determine an aggregate static parameter value. In one embodiment, the aggregate static parameter value may be determined by summing the weighted static parameter values. The aggregate static parameter value may be multiplied (at block 162) by the static weight 58 for the device type (tier) of storage device i.

For each dynamic parameter value $116_k$, the storage manager 14 multiplies (at block 164) the dynamic parameter value $116_k$ by the dynamic parameter weight $76_k$ for the corresponding dynamic parameter $74_k$ for the storage device type of storage device i to determine an aggregate dynamic parameter value. In one embodiment, the aggregate dynamic parameter value may be determined by summing the weighted dynamic parameter values. The aggregate dynamic parameter value may be multiplied (at block 166) by the dynamic weight 78 for the device type (tier) of storage device i.

The storage manager 14 may further determine (at block 168) a vendor value 84, 96 (FIG. 4) for the vendor 94 of storage device i and multiply (at block 170) the determined vendor value 96 by a vendor weight 60 for the storage device type 52 of storage device i to determine a weighted vendor value.

The storage manager 14 may calculate (at block 174) the storage device weight value 138 as a function of the weighted aggregate dynamic parameter value, the weighted static parameter value, and the weighted vendor value. The calculated storage device weight value 138 may then be stored (at block 176) with the storage device specific information 130.

In one embodiment, equation (1) below may be used to calculate the storage device weight value 138 for a particular storage device $4_1, 4_2, 4_3 \ldots 4_n$ based on the static parameter value $96_i$ (SPV$_i$), static parameter weight $56_i$ (SPW$_1$), static weight 58 (Stat_Wt), dynamic parameter value $116_i$ (DPV$_1$), dynamic parameter weight $76_j$ (DPW$_j$), dynamic weight 78 (Dyn_Wt), vendor value 84, 96 (Ven_Val), and vendor weight 60 (Ven_Wt).

$$[\text{Stat}_{Wt} \times \Sigma_{i=1}^{n}(\text{SPV}_i \times \text{SPW}_i)] + [\text{Dyn}_{Wt} \times \Sigma_{j=1}^{m}(\text{DPV}_j \times \text{DPW}_j)] + (\text{Ven\_Val} \times \text{Ven\_Wt}) \quad (1)$$

Equation (1) provides one embodiment for calculating the storage device weight value 138. In additional embodiments, different operations other than the above shown multiplication and addition operations may be applied to the dynamic parameter values, static parameter values, and/or vendor values to calculate the storage device specific weight. Further, additional or different variables may be used in reaching the calculation for determining a value or ranking for storage devices in a storage device tier when making a selection for migration or some other purpose.

Figure 9:
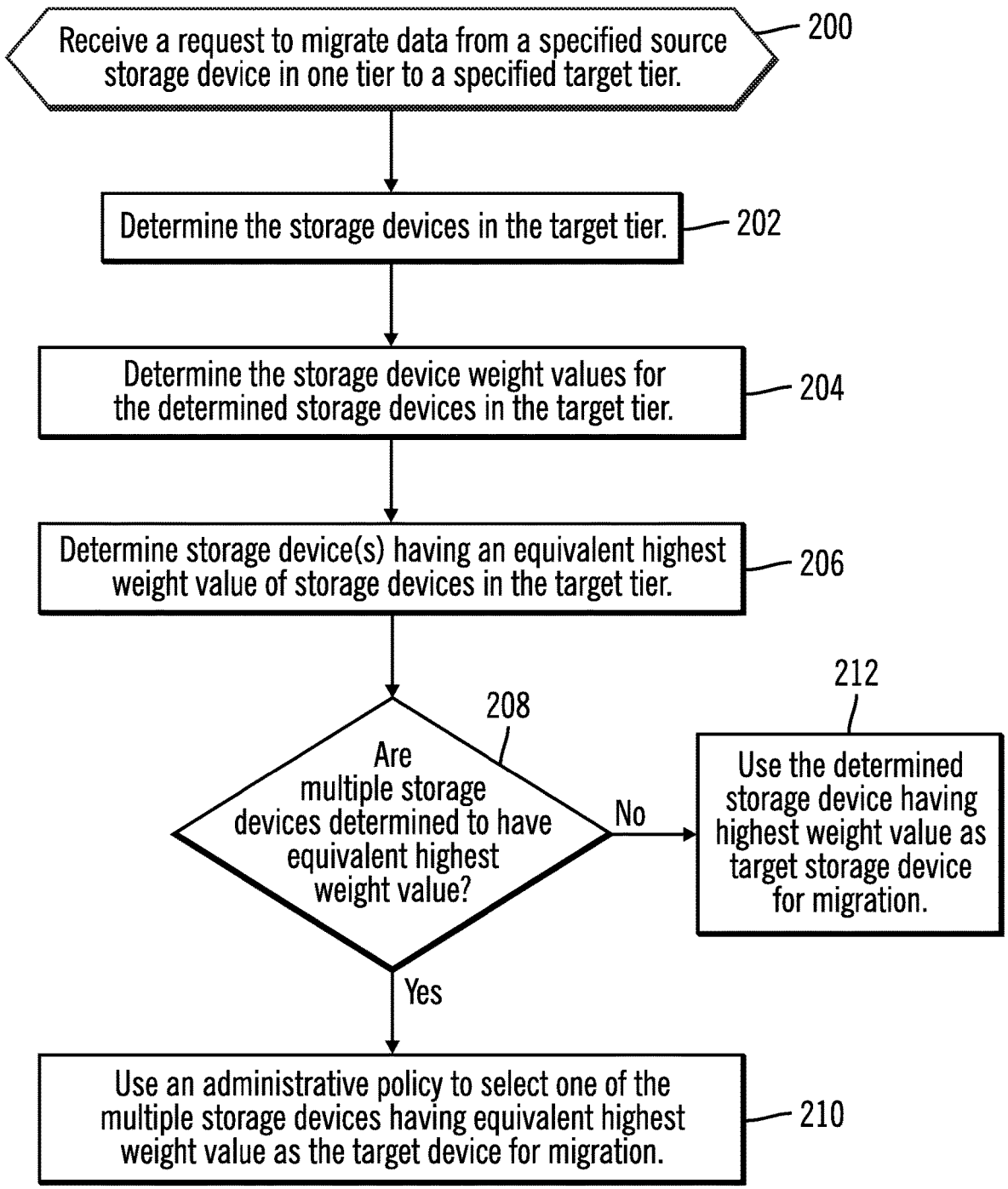
FIG. 9 illustrates an embodiment of operations to select a storage device from a target tier in response to a request to migrate data from a source storage device to a specified target tier.

FIG. 9 illustrates an embodiment of operations performed by the storage manager 14 to process a request to migrate data from a specified source storage device $4_1, 4_2, 4_3 \ldots 4_n$ in one tier to a specified target tier, where the target tier may comprise a higher or lower tier than the source tier. Upon receiving (at block 200) the request, the storage manager 14 determines (at block 202) the storage devices $4_1, 4_2, 4_3 \ldots 4_n$, in the target storage tier, i.e., storage type. The storage manager 14 determines (at block 204) the storage device weight values 138 for the determined storage devices $4_1, 4_2, 4_3 \ldots 4_n$, in the specified target storage tier from the storage device specific information 26. The storage manager 14 determines (at block 206) storage device(s) having an equivalent highest weight value 138 of the storage devices in the target tier. An equivalent highest weight value may mean the weight values 138 need to be equal or within a defined margin of difference. If (at block 208) there are multiple storage devices $4_1, 4_2, 4_3 \ldots 4_n$ determined to have equivalent weight values 138, then the storage manager 14 uses (at block 208) an administrative policy to select one of the multiple storage devices $4_1, 4_2, 4_3 \ldots 4_n$, having an equivalent highest weight value 138 as the target device for migration. The administrative policy may select a target storage device closest to the source storage device, a target storage device at a distance from the source storage device closest to a minimum remote distance, having a similar configuration, or some other factors. If (at block 208) there is only one storage device having the highest weight value, then the storage manager 14 uses (at block 212) the determined storage device $4_1, 4_2, 4_3 \ldots 4_n$ having highest weight value 138 as the target storage device for migration.

Described embodiments provide techniques for selecting a storage device in a tier to use for migration for data from a higher tier that takes into account static parameter values of the storage devices in a tier, dynamic parameter values queries from the device and indicating the health of the device, as well as vendor values indicating a preference for different vendors. In this way, a most suitable storage device in a tier may be selected to store migrated data as part of a migration or other data movement operation.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for migrating data from a source storage in a source storage tier of storage device to at least one storage device in a target storage tier, the computer program product comprising a non-transitory computer readable storage medium having computer readable program code embodied therein that executes to perform operations, the operations comprising:
   querying storage devices in the target storage tier to determine dynamic parameter values based on changing operational states of the storage devices indicating a health of the storage devices including a remaining life of the storage devices, wherein the source storage tier has a different type of storage device than storage devices in the target storage tier;
   determining, for each of the storage devices in the target storage tier, a storage device weight value as a function of the determined dynamic parameter values of the storage device indicating a health of the storage device; and
   in response to receiving a request to migrate data from the source storage tier to the target storage tier, performing:
      determining storage device weight values of the storage devices in the target storage tier; and
      using the determined storage device weight values of the storage devices in the target storage tier to select at least one of the storage devices in the target storage tier having a highest storage device weight value indicating a highest relative health among the storage devices in the target storage tier to which data from the source storage is migrated.

2. The computer program product of claim 1, wherein the operations further comprise:
   determining static parameter values indicating vendor supplied information on manufactured characteristics of the storage devices, wherein the function uses at least two of the static parameter values and the dynamic parameter values to determine the storage device weight values.

3. The computer program product of claim 2, wherein the vendor supplied information on the manufactured characteristics of the storage devices in the target storage tier includes at least one of a mean time between failure, read/write performance, availability, and durability, and wherein dynamic parameters comprising at least one of a errors encountered, temperature, and data throughput, and wherein the dynamic parameter values based on operational states of the storage devices related to at least one of condition of hardware components of the storage devices, measured performance, and sensed environmental measurements includes at least one of position of hardware components, remapped sectors, internally detected errors, error correction codes, error counts indicating a number of errors encountered, detected operational times, temperature of the storage devices, data throughput, humidity, and number of times written.

4. The computer program product of claim 2, wherein the function applies static parameter weight values to the static parameter values to determine an aggregate static parameter value and applies dynamic parameter weight values to the dynamic parameter values to determine an aggregate dynamic parameter value, wherein the storage device weight value is a function of the aggregate static parameter value and the aggregate dynamic parameter value.

5. The computer program product of claim 4, wherein the function provides a dynamic weight and a static weight, wherein the function applies the dynamic weight to the aggregate dynamic parameter value to produce a weighted aggregate dynamic parameter value and the static weight to the aggregate static parameter value to produce a weighted aggregate static parameter value, wherein the storage device weight value is a function of the weighted aggregate dynamic parameter value and the weighted aggregate static parameter value.

6. The computer program product of claim 1, wherein the storage devices are identified in the source and the target storage tiers based on characteristics of the storage devices, wherein the source and the target storage tiers have different parameters, wherein the dynamic parameter values for storage devices within one of the source and the target storage tiers are capable of comprising different values.

7. The computer program product of claim 1, wherein the dynamic parameter values are related to a number of writes and total data written indicating a remaining life span of the storage devices.

8. A system for migrating data from a source storage in a source storage tier of storage device to at least one storage device in a target storage tier, comprising:
   a processor; and
   computer readable storage medium having code executed by the processor to perform operations, the operations comprising:
      querying storage devices in the target storage tier to determine dynamic parameter values based on changing operational states of the storage devices indicating a health of the storage devices including a remaining life of the storage devices, wherein the source storage tier has a different type of storage device than storage devices in the target storage tier;
      determining, for each of the storage devices in the target storage tier, a storage device weight value as a function of the determined dynamic parameter values of the storage device indicating a health of the storage device; and
      in response to receiving a request to migrate data from the source storage tier to the target storage tier, performing:
         determining storage device weight values of the storage devices in the target storage tier; and
         using the determined storage device weight values of the storage devices in the target storage tier to select at least one of the storage devices in the target storage tier having a highest storage device weight value indicating a highest relative health among the storage devices in the target storage tier to which data from the source storage is migrated.

9. The system of claim 8, wherein the operations further comprise:
   determining static parameter values indicating vendor supplied information on manufactured characteristics of the storage devices, wherein the function uses at least two of the static parameter values and the dynamic parameter values to determine the storage device weight values.

10. The system of claim 9, wherein the vendor supplied information on the manufactured characteristics of the storage devices in the target storage tier includes at least one of a mean time between failure, read/write performance, availability, and durability, and wherein dynamic parameters comprising at least one of a errors encountered, temperature, and data throughput, and wherein the dynamic parameter values based on operational states of the storage devices related to at least one of condition of hardware components of the storage devices, measured performance, and sensed environmental measurements includes at least one of position of hardware components, remapped sectors, internally detected errors, error correction codes, error counts indicating a number of errors encountered, detected operational times, temperature of the storage devices, data throughput, humidity, and number of times written.

11. The system of claim 9, wherein the function applies static parameter weight values to the static parameter values to determine an aggregate static parameter value and applies dynamic parameter weight values to the dynamic parameter values to determine an aggregate dynamic parameter value, wherein the storage device weight value is a function of the aggregate static parameter value and the aggregate dynamic parameter value.

12. The system of claim 11, wherein the function provides a dynamic weight and a static weight, wherein the function applies the dynamic weight to the aggregate dynamic parameter value to produce a weighted aggregate dynamic parameter value and the static weight to the aggregate static parameter value to produce a weighted aggregate static parameter value, wherein a storage device weight value is a function of the weighted aggregate dynamic parameter value and the weighted aggregate static parameter value.

13. The system of claim 8, wherein the storage devices are identified in the second source and the target storage tiers based on characteristics of the storage devices, wherein the source and the target storage tiers have different parameters, wherein the dynamic parameter values for storage devices within one of the source and the target storage tiers are capable of comprising different values.

14. The system of claim 8, wherein the dynamic parameter values are related to a number of writes and total data written indicating a remaining life span of the storage devices.

15. A method for migrating data from a source storage in a source storage tier of storage device to at least one storage device in a target storage tier, comprising:
   querying storage devices in the target storage tier to determine dynamic parameter values based on changing operational states of the storage devices indicating a health of the storage devices including a remaining life of the storage devices, wherein the source storage tier has a different type of storage device than storage devices in the target storage tier;
   determining, for each of the storage devices in the target storage tier, a storage device weight value as a function of the determined dynamic parameter values of the storage device indicating a health of the storage device;
   in response to receiving a request to migrate data from the source storage tier to the target storage tier, performing:
      determining storage device weight values of the storage devices in the target storage tier; and
      using the determined storage device weight values of the storage devices in the target storage tier to select at least one of the storage devices in the target storage tier having a highest storage device weight value indicating a highest high relative health among the storage devices in the target storage tier to which data from the source storage is migrated.

16. The method of claim 15, further comprising:
   determining static parameter values indicating vendor supplied information on manufactured characteristics of the storage devices, wherein the function uses at least two of the static parameter values and the dynamic parameter values to determine the storage device weight values.

17. The method of claim 16, wherein the vendor supplied information on the manufactured characteristics of the storage devices in the target storage tier includes at least one of a mean time between failure, read/write performance, availability, and durability, and wherein dynamic parameters comprising at least one of a errors encountered, temperature, and data throughput, and wherein the dynamic parameter values based on operational states of the storage devices related to at least one of condition of hardware components of the storage devices, measured performance, and sensed environmental measurements includes at least one of position of hardware components, remapped sectors, internally detected errors, error correction codes, error counts indicating a number of errors encountered, detected operational times, temperature of the storage devices, data throughput, humidity, and number of times written.

18. The method of claim 16, wherein the function uses one parameter weight value for each of the dynamic and static parameters and applies the parameter weight values for the static parameters to the static parameter values to determine an aggregate static parameter value and applies the parameter weight values for dynamic parameters to the dynamic parameter values to determine an aggregate dynamic parameter value, wherein the storage device weight value is a function of the aggregate static parameter value and the aggregate dynamic parameter value.

19. The method of claim 18, wherein the function provides a dynamic weight and a static weight, wherein the function applies the dynamic weight to the aggregate dynamic parameter value to produce a weighted aggregate dynamic parameter value and the static weight to the aggregate static parameter value to produce a weighted aggregate static parameter value, wherein the storage device weight value is a function of the weighted aggregate dynamic parameter value and the weighted aggregate static parameter value.

20. The method of claim 15, wherein the storage devices are identified in the source and the target storage tiers based on characteristics of the storage devices, wherein the source and the target storage tiers have different parameters, wherein the dynamic parameter values for storage devices within one of the source and the target storage tiers are capable of comprising different values.

21. The method of claim 15, wherein the dynamic parameter values are related to a number of writes and total data written indicating a remaining life span of the storage devices.

* * * * *